(12) United States Patent
Merabet et al.

(10) Patent No.: US 12,038,410 B2
(45) Date of Patent: Jul. 16, 2024

(54) METHOD FOR ULTRASOUND IMAGING USING TWO-DIMENSIONAL FOURIER TRANSFORM, CORRESPONDING COMPUTER PROGRAM AND ULTRASOUND PROBE DEVICE

(71) Applicants: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE, Paris Cedex (FR)

(72) Inventors: Lucas Merabet, Paris (FR); Sébastien Robert, Le Kremlin-Bicêtre (FR); Claire Prada Julia, Paris (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 510 days.

(21) Appl. No.: 17/416,325

(22) PCT Filed: Dec. 19, 2019

(86) PCT No.: PCT/FR2019/053179
§ 371 (c)(1),
(2) Date: Jun. 18, 2021

(87) PCT Pub. No.: WO2020/128344
PCT Pub. Date: Jun. 25, 2020

(65) Prior Publication Data
US 2022/0082526 A1  Mar. 17, 2022

(30) Foreign Application Priority Data

Dec. 20, 2018 (FR) ...................... 1873636

(51) Int. Cl.
*G01N 29/06* (2006.01)
*G01N 29/46* (2006.01)

(52) U.S. Cl.
CPC .......... *G01N 29/069* (2013.01); *G01N 29/46* (2013.01); *G01N 2291/0289* (2013.01); *G01N 2291/106* (2013.01)

(58) Field of Classification Search
CPC .. G01N 29/069; G01N 29/07; G01N 29/0654; G01N 29/46; G01N 2291/106
See application file for complete search history.

(56) References Cited

U.S. PATENT DOCUMENTS

2016/0349218 A1* 12/2016 Robert ................... G01N 29/07

OTHER PUBLICATIONS

Hunter et al., "The Wavenumber Algorithm for Full-Matrix Imaging using an Ultrasonic Array", IEEE Transactions on Ultrasonics, Ferroelectrics and Frequency Control, vol. 55, Issue: 11, pp. 2450-2462, Nov. 2008.*

(Continued)

*Primary Examiner* — Manuel L Barbee
(74) *Attorney, Agent, or Firm* — BakerHostetler

(57) ABSTRACT

This two-dimensional Fourier transform ultrasound imaging method includes by controlling transmitting and receiving transducers: obtaining M matrices $MR_m$, $1 \leq m \leq M$, of sampled ultrasonic time signals; two-dimensional Fourier transforming each matrix $MR_m$ to obtain M spectral matrices $FTMR_m$; converting each spectral matrix $FTMR_m$ to obtain M spectral images $FTI_m$; combining the M spectral images $FTI_m$ and two-dimensional inverse Fourier transforming the resulting spectral image FTI to obtain an ultrasound image I. The conversion includes taking into account a change of propagation mode during a backscatter, by adding a parameter characterizing this change of mode in equations (SYS) of change of reference frame, and/or taking into account a (Continued)

reflection against a wall, by adding a phase shift term in a relation (REL) of matrix transformation.

11 Claims, 5 Drawing Sheets

(56) References Cited

OTHER PUBLICATIONS

Zhang, et al., "Defect detection using ultrasonic arrays: The multi-mode total focusing method", NDT and E International, vol. 43, No. 2, pp. 123-133, Mar. 2010.
Cheng, et al., "Extended high-frame rate imaging method with limited-diffraction beams", IEEE Transactions on Ultrasonics, Ferroelectrics, and Frequency Control, vol. 53, No. 5, pp. 880-899, May 2006.

* cited by examiner

Fig. 1

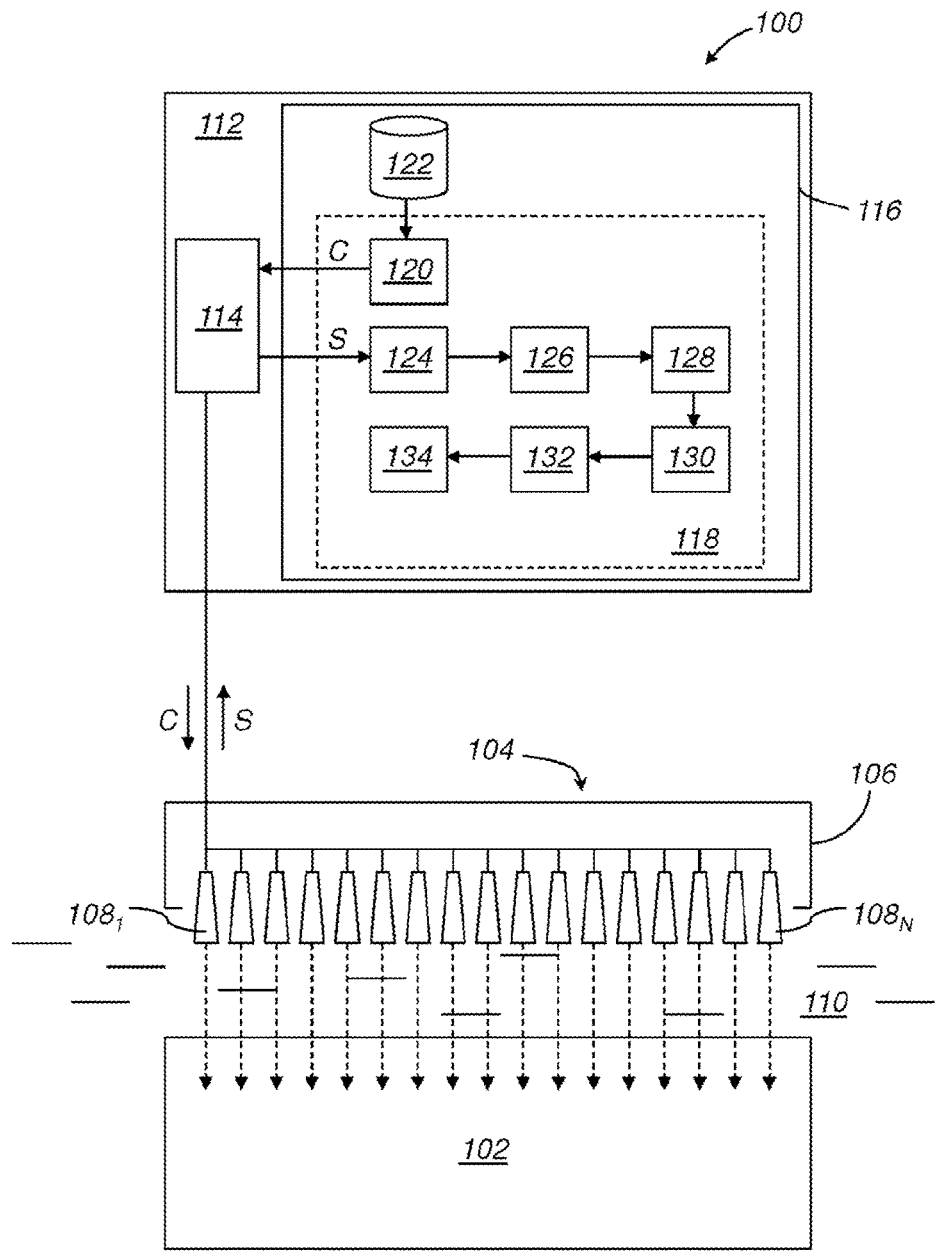

LEGEND:

102 - object
112 - electronic circuit
114 - central processing unit
118 - computer program
120 - instructions for generating control signals C
122 - delay law database
124 - instructions to construct M plane wave matrices
126 - instructions to perform temporal filtering
128 - instructions for transforming each plane wave matrix into a spectral matrix
130 - instructions to convert each spectral matrix into a spectral image
132 - instructions for performing a combination of the M spectral images into a single resulting spectral image
134 - instructions for transforming the resulting spectral image into an ultrasound image

METHOD FOR ULTRASOUND IMAGING USING TWO-DIMENSIONAL FOURIER TRANSFORM, CORRESPONDING COMPUTER PROGRAM AND ULTRASOUND PROBE DEVICE

CROSS-REFERENCE TO RELATED APPLICATIONS

This application is a National Stage of International patent application PCT/FR2019/053179, filed on Dec. 19, 2019, which claims priority to foreign French patent application No. FR 1873636, filed on Dec. 20, 2018, the disclosures of which are incorporated by reference in their entirety.

FIELD OF THE INVENTION

The present invention relates to an imaging method by two-dimensional Fourier transform of an ultrasonic probe acquisition of an object. It also relates to a computer program and a corresponding ultrasound probing device.

More particularly, the invention applies to a two-dimensional Fourier transform imaging method of an acquisition by ultrasonic probing of an object, comprising the following steps:
- control of L transmission transducers for M successive transmissions of ultrasonic waves,
- control of N receiving transducers in such a way as to receive simultaneously and for a predetermined period of time, for each transmission, N measurement time signals, measuring in particular echoes due to backscattering of said each transmission in the object,
- time sampling of each measurement time signal into $N_t$ successive samples,
- obtaining M matrices $MR_m$, $1 \leq m \leq M$, of ultrasonic time signals of size $N \times N_t$, each coefficient $MR_m(u_i, t_j)$ of each matrix $MR_m$ representing the $t_j$-th time sample of the measurement signal received by the $u_i$-th receiving transducer due to the m-th transmission,
- row and column two-dimensional Fourier transform of each matrix $MR_m$ to obtain M spectral matrices $FTMR_m$, $1 \leq m \leq M$,
- conversion of each spectral matrix $FTMR_m$ to obtain M spectral images $FTI_m$ in a space of spatial frequencies, this conversion comprising the application of a relation for matrix transformation of the M matrices $FTMR_m$ into the M spectral images $FTI_m$ and the application of a bilinear interpolation by means of a system of equations of change of reference frame,
- combination of the M spectral images $FTI_m$ and two-dimensional inverse Fourier transformation in rows and columns of the resulting spectral image FTI to obtain an ultrasound image I of the object.

Such a method is for example described in the article by Hunter et al, entitled «The wavenumber algorithm for full-matrix imaging using an ultrasonic array», published in IEEE Transactions on Ultrasonics, Ferroelectrics, and Frequency Control, volume 55, No. 11, pages 2450-2462, November 2008. The acquisition of the signals is done by the FMC technique («Full-Matrix Capture») according to which the L transmission transducers are controlled for M=L successive transmissions of cylindrical ultrasonic waves and N=L receptions.

Such a method is also described in the article by Cheng and al, entitled «Extended high-frame rate imaging method with limited-diffraction beams», published in IEEE Transactions on Ultrasonics, Ferroelectrics, and Frequency Control, volume 53, No. 5, pages 880-899, May 2006. The acquisition of the signals is done this time by the PWI technique («Plane Wave Imaging») according to which the L transmission transducers are controlled for M successive transmissions of plane ultrasonic waves and N=L receptions. In general, M is significantly smaller than L and N.

This method is advantageous because of its algorithmic speed and the quality of the result obtained. However, it works in a simple context of medical imaging or non-destructive testing when the defects to be visualized are easily detected in direct mode, i.e. by direct backscattering without internal reflection in the object 102 and without change of propagation mode. As soon as the situation becomes more complicated, in particular because of more complex defects, such as extended or flat defects, or when these defects are close to the edges of the object, the quality of the resulting image deteriorates rapidly.

Thus, it may be desired to provide a two-dimensional Fourier transform ultrasound imaging method that avoids at least part of the aforementioned degradation problem.

A method for two-dimensional Fourier transform imaging of an acquisition by ultrasonic probing of an object is therefore proposed, comprising the following steps:
- control of L transmission transducers for M successive transmissions of ultrasonic waves,
- control of N receiving transducers in such a way as to receive simultaneously and for a predetermined period of time, for each transmission, N measurement time signals, measuring in particular echoes due to backscattering of said each transmission in the object,
- time sampling of each measurement time signal in $N_t$ successive samples,
- obtaining M matrices $MR_m$, $1 \leq m \leq M$, of ultrasonic time signals of size $N \times N_t$, each coefficient $MR_m(u_i, t_j)$ of each matrix $MR_m$ representing the $t_j$-th time sample of the measurement signal received by the $u_i$-th receiving transducer due to the m-th transmission,
- row and column two-dimensional Fourier transform of each matrix $MR_m$ to obtain M spectral matrices $FTMR_m$, $1 \leq m \leq M$,
- conversion of each spectral matrix $FTMR_m$ to obtain M spectral images $FTI_m$ in a space of spatial frequencies, this conversion comprising the application of a relation for matrix transformation of the M matrices $FTMR_m$ into the M spectral images $FTI_m$ and the application of a bilinear interpolation using a system of equations for change of reference frame,
- combination of the M spectral images $FTI_m$ and two-dimensional inverse Fourier transformation in rows and columns of the resulting spectral image FTI to obtain an ultrasound image I of the object,
and wherein the conversion comprises:
- taking into account a change of propagation mode during a backscattering in the probed object, by adding a parameter characterizing this change of mode in the reference frame change equations, and/or
- taking into account a reflection against a wall of the probed object, by adding a phase shift term in the matrix transformation relation.

Thus, taking into account more complex backscatter situations than simple direct mode backscatter using parameters or terms integrated in the matrix transformation or reference frame change relations of the conversion step allows a clear improvement of the image obtained without any real additional cost in terms of algorithmic complexity. Extended or flat complex defects, near the edges of the object, are also better detected, localized and visualized.

Optionally, the L transmitting transducers are controlled for M successive transmissions of plane ultrasonic waves with different successive transmission angles $\theta_m$ in M transmission zones.

Also optionally, when converting each spectral matrix $FTMR_m$ to each spectral image $FTI_m$, the reference frame change equations take the following form:

$$\begin{cases} kx = ku + \gamma \cdot kt \cdot \sin\theta'_m \\ kz = \pm\sqrt{kt^2 - ku^2} \pm \gamma \cdot kt \cdot \cos\theta'_m, \end{cases}$$

where ku and kt are the spatial and temporal wavenumbers, respectively, representative of the rows and columns of each spectral matrix $FTMR_m$, kx and kz are the spatial frequencies representative of the rows and columns of each spectral image $FTI_m$, $\pm$ represents an addition or subtraction, $\gamma$ is the parameter characterizing the change in propagation mode upon backscattering in the probed object, and $\theta'_m$ is an incident angle upon backscattering determinable from $\theta_m$ using the Snell-Descartes law.

Also optionally, the parameter $\gamma$ is defined as the ratio of the propagation velocity of any wave transmitted according to its propagation mode after backscattering in the probed object to the propagation velocity of the same wave according to its propagation mode before backscattering in the probed object.

Also optionally, when converting each spectral matrix $FTMR_m$ to each spectral image $FTI_m$, the matrix transformation relationship takes the following form:

$$FTI_m(kx,kz) = \sqrt{kt^2 - ku^2} \cdot e^{j\varphi(ku,kt,\theta_m)} \cdot FTMR_m(ku,kt),$$

where ku and kt are the spatial and temporal wavenumbers, respectively, representative of the rows and columns of each spectral matrix $FTMR_m$, kx and kz are the spatial frequencies representative of the rows and columns of each spectral image $FTI_m$, e is the exponential function, j is the pure imaginary number such that $j^2=-1$ and $\varphi$ is a phase shift function depending on ku, kt and $\theta_m$.

Also optionally, the imaging method does not take into account any reflection against a wall of the object and:

$$\varphi(ku, kt, \theta_m) = 0,$$

$$\begin{cases} kx = ku + \gamma \cdot kt \cdot \sin\theta_m \\ kz = \sqrt{kt^2 - ku^2} + \gamma \cdot kt \cdot \cos\theta_m \end{cases}.$$

Also optionally, the imaging method takes into account a reflection against a bottom of the object located at a distance H from a front face of the object receiving the waves transmitted by the transmitting transducers, and:

$$\varphi(ku, kt, \theta_m) = H \cdot (\gamma_r \cdot \gamma \cdot kt \cdot \cos\theta_m + \gamma \cdot kt \cdot \cos\theta'_m),$$

$$\begin{cases} kx = ku + \gamma \cdot kt \cdot \sin\theta'_m \\ kz = \sqrt{kt^2 - ku^2} + \gamma \cdot kt \cdot \cos\theta'_m \end{cases},$$

where $\gamma_r$ is a parameter characterizing a possible change in propagation mode upon reflection against the bottom of the probed object, in particular defined as the ratio between the propagation velocity of any wave transmitted according to its propagation mode after its reflection and the propagation velocity of this same wave according to its propagation mode before its reflection.

Also optionally, the imaging method takes into account a first reflection against a bottom of the object located at a distance H from a front face of the object receiving the waves transmitted by the transmitting transducers, a second reflection against the front face of the object and a third reflection against the bottom of the object, and:

$$\varphi(ku, kt, \theta_m) = H \cdot \Big(\gamma_{r1} \cdot \gamma_{r2} \cdot \gamma \cdot kt \cdot \cos\theta_m + \gamma_{r2} \cdot \gamma \cdot kt \cdot \cos\theta''_m + \sqrt{kt^2 - ku^2} + \sqrt{(kt/\gamma_{r4})^2 - ku^2}\Big),$$

$$\begin{cases} kx = ku + \gamma \cdot kt \cdot \sin\theta'_m \\ kz = -\sqrt{kt^2 - ku^2} + \gamma \cdot kt \cdot \cos\theta'_m \end{cases},$$

where $\gamma_{r1}$ is a parameter characterizing a possible change of propagation mode during the first reflection against the bottom of the probed object, in particular defined as the ratio between the propagation velocity of any wave transmitted according to its propagation mode after its first reflection and the propagation velocity of this same wave according to its propagation mode before its first reflection, $\gamma_{r2}$ is a parameter characterizing a possible change of propagation mode during the second reflection against the front face of the probed object, in particular defined as a ratio between the propagation velocity of any wave transmitted according to its propagation mode after its second reflection and the propagation velocity of the same wave according to its propagation mode before its second reflection, $\gamma_{r4}$ is a parameter characterizing a possible change in propagation mode during the third reflection against the bottom of the probed object, in particular defined as a ratio between the propagation velocity of any wave transmitted according to its propagation mode after its third reflection and the propagation velocity of the same wave according to its propagation mode before its third reflection, and $\theta''_m$ is a reflected angle during the first reflection against the bottom of the object determinable from $\theta_m$ using the Snell-Descartes law.

Also optionally, the conversion of each spectral matrix $FTMR_m$ to obtain the M spectral images $FTI_m$ includes a support limitation of a spectral space of each spectral matrix $FTMR_m$ to keep only the propagating waves and to remove any correspondence ambiguity between the spectral space of each spectral matrix $FTMR_m$ and that of the corresponding spectral image $FTI_m$ when the system of reference frame change equations is not bijective.

A computer program is also proposed, which is downloadable from a communication network and/or stored on a computer-readable medium and/or executable by a processor, comprising instructions for performing the steps of an imaging method according to the invention, when said program is executed on a computer.

An ultrasonic probing device is also proposed, for ultrasonic probing of an object, comprising:
- a probe comprising L ultrasound transmission transducers and N ultrasound reception transducers,
- means for controlling the L transmission transducers for M successive transmissions of ultrasonic waves,
- means for controlling the N receiving transducers in such a way as to receive simultaneously and for a predetermined duration, for each transmission, N measurement time signals, measuring in particular echoes due to backscattering of said each transmission, and a processor for reconstructing an ultrasound image for visualizing the object, configured to perform the following processing:

temporal sampling of each measurement time signal in $N_t$ successive samples, obtaining M matrices $MR_m$, $1 \leq m \leq M$, of ultrasonic time signals of size $N \times N_t$, each coefficient $MR_m(u_i, t_j)$ of each matrix $MR_m$ representing the $t_j$-th time sample of the measurement signal received by the $u_i$-th receiving transducer due to the m-th transmission, row and column two-dimensional Fourier transform of each matrix $MR_m$ to obtain M spectral matrices $FTMR_m$, $1 \leq m \leq M$, conversion of each spectral matrix $FTMR_m$ to obtain M spectral images $FTI_m$ in a space of spatial frequencies, this conversion comprising the application of a matrix transformation relation of the M matrices $FTMR_m$ into the M spectral images $FTI_m$ and the application of a bilinear interpolation by means of a system of equations of change of reference frame, combination of the M spectral images $FTI_m$ and two-dimensional inverse Fourier transformation in rows and columns of the resulting spectral image FTI to obtain an ultrasound image I of the object, the processor being further configured to:

take into account a change of propagation mode during a backscatter in the probed object, by adding a parameter characterizing this change of mode in the reference frame change equations, and/or take into account a reflection against a wall of the probed object, by adding a phase shift term in the matrix transformation relation, when it performs the conversion.

BRIEF DESCRIPTION OF THE DRAWINGS

The invention will be better understood via the following description, given only as an example and made in reference to the appended drawings in which:

FIG. 1 diagrammatically shows the general structure of an ultrasonic probing device according to one embodiment of the invention.

DETAILED DESCRIPTION

Figure 2:
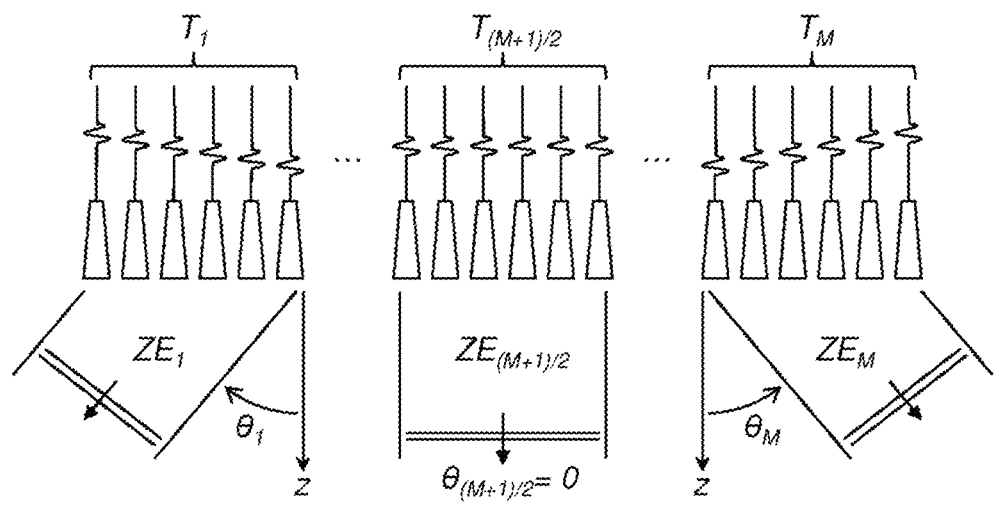
FIG. 2 shows a principle of successive transmissions of plane ultrasonic waves that can be implemented by the device of FIG. 1.

With reference to FIG. 1, a device 100 for probing an object 102 according to an embodiment of the invention comprises an ultrasonic probe 104 having a housing 106, i.e. a non-deformable structural element which serves as a reference frame attached to the probe 104, in which are arranged, for example linearly or in a matrix, L=N fixed or mobile transducers $108_1, \ldots, 108_N$ arranged in an array. It is thus a multi-element probe.

The object 102 is, for example, a mechanical part that one wishes to examine by non-destructive testing or, in a medical context, a part of a human or animal body that one wishes to test non-invasively. In the embodiment shown in FIG. 1, the object 102 is immersed in a liquid, such as water 110, and the probe 104 is held at a distance from the object 102 so that the water 110 separates them. But in another equivalent embodiment, the probe 104 could be in direct contact with the object 102. It is even this other embodiment which will be rather approached in the following description.

The transducers $108_1, \ldots, 108_N$ are designed to individually transmit ultrasonic waves towards the object 102 in response to control signals identified under the general reference C, along main directions parallel to each other, indicated by dotted arrows in FIG. 1, and in a main plane which is that of the Figure.

The transducers $108_1, \ldots, 108_N$ are further designed to detect echoes of the ultrasonic waves reflecting or backscattering off and into the object 102 and to provide measurement signals identified under the general reference S and corresponding to these echoes. Thus, in the non-limiting example of FIG. 1, the transducers $108_1, \ldots, 108_N$ perform both the transmitting and receiving functions, but receivers different from the transmitters could also be provided in different and independent housings while remaining consistent with the principles of the invention. Moreover, the number L of transmitters could be quite different from the number N of receivers.

The probing device 100 further includes an electronic circuit 112 for controlling the transducers $108_1, \ldots, 108_N$ of the probe 104 and for processing the measurement signals S. This electronic circuit 112 is connected to the probe 104 in order to transmit the control signals C to it and in order to receive the measurement signals S. The electronic circuit 112 is for example that of a computer. It has a central processing unit 114, such as a microprocessor designed to transmit the control signals C to the probe 104 and to receive the measurement signals S from the probe 104, and a memory 116 in which a computer program 118 is especially stored.

The computer program 118 first includes instructions 120 for generating the control signals C for the transducers $108_1, \ldots, 108_N$ and receiving their echoes. Specifically, these instructions are programmed to:

activate the L=N transducers $108_1, \ldots, 108_N$ as transmitters for M successive transmissions of ultrasound waves, activating the transducers $108_1, \ldots, 108_N$ as receivers in order to receive simultaneously, following each transmission, by these N receivers and during a predetermined duration of the desired inspection depth, N measurement time signals, measuring in particular echoes due to back-scattering of each transmission considered in the object 102.

In particular, plane ultrasonic waves having M different successive transmission angles in M transmission zones of the object 102 can be obtained on transmission by applying to the transducers $108_1, \ldots, 108_N$ delay laws stored in memory 116 in a delay law database 122. Each delay law defines delays to be applied to the transducers $108_1, \ldots, 108_N$ during transmission, so as to generate a plane ultrasonic wave at a desired transmission angle among the M different successive transmission angles. There are therefore as many delay laws as there are successive desired transmissions.

As shown in FIG. 2, in a particular case where the number M of successive transmissions is odd and where the transmission angles follow one another with a constant pitch in an angular sector symmetrical with respect to the z direction orthogonal to the array of transducers $108_1, \ldots, 108_N$, the first plane wave transmission is associated with a delay law $T_1$ relating to signals transmitted by the transducers $108_1, \ldots, 108_N$, allowing the transmission of a plane wave of transmission angle $\theta_1$ with respect to the z direction in a first transmission zone $ZE_1$ partially located outside of the aperture of the probe 104. The (M+1)/2-th plane wave transmission is associated with a uniform delay law $T_{(M+1)/2}$ for the transmission of a plane wave of zero transmission angle with respect to the z-direction in an (M+1)/2-th transmission zone $ZE_{(M+1)/2}$ covering the probe aperture 104. Finally, the last plane wave transmission is associated with a delay law $T_M$ allowing the transmission of a plane wave of transmission angle $\theta_M=-\theta_1$ with respect to the z direction in a last transmission zone $ZE_M$ partially located outside of the aperture of the probe 104. Generally speaking, the m-th plane wave transmission is associated with a delay law $T_m$ allowing the transmission of a plane wave of transmission angle $\theta_m=\theta_1+(m-1)\cdot(\theta_M-\theta_1)/(M-1)$ with respect to the z direction. In reality, most often M is even: there is then no transmission at 0° and the angular pitch is not constant.

Given the acquisition technique employed, the zone to be imaged must be contained within the union of the M successive transmission zones. As a result, this zone can extend beyond the aperture of the probe 104, as can be seen in FIG. 2. In particular, the imaged zone can take the form of a sectorial zone delimited by the extremities of the transmission zones of maximum and minimum angles. An S-scan type image can thus be obtained.

Alternatively, and as advantageously made possible by the principle of acquisition of signals by successive plane wave transmissions, the M different successive transmission angles $\theta_1$ to $\theta_M$ can be defined around an average direction $\theta_{(M+1)/2}$ not perpendicular to the transducer array $108_1, \ldots, 108_N$. In particular, when it is a question of detecting defects such as a crack disposed at the bottom of an object to be inspected in non-destructive testing, this crack being moreover perpendicular to the transducer array, it is preferable to laterally shift the zone to be inspected with respect to the probe 104 and to transmit around an average of 45° for example. The zone to be inspected can even be shifted to the point of completely leaving the opening of the probe 104.

In order to improve the quality of the measurement signals used to reconstruct the imaged zone, it is also possible to apply an apodization of the ultrasonic signals transmitted by the transducers $108_1, \ldots, 108_N$ to form a plane ultrasonic wave of better quality, without distortion suffered due to edge effects. Such an apodization is performed at each transmission spatially on all the transducers using an apodization window such as a trapezoidal, Hanning or Blackman-Harris amplitude law. This results in a better definition of the successive transmission zones.

According to other embodiments than the one shown in FIGS. 1 and 2 and discussed in the present description, waves other than plane waves can be transmitted, for example cylindrical waves as in the above-mentioned article by Hunter et al. It is sufficient to adapt the number of transducers to be used (between 1 and L) and the delay laws accordingly, as a function to the acquisitions and applications targeted. Nevertheless, in the following description and in order to simplify the calculations that will be presented, plane transmissions such as those shown in FIG. 2 are retained.

Referring again to FIG. 1, upon receipt of the signals resulting from each of the M successive transmissions, the set S of N×M measurement time signals received by the N transducers $108_1, \ldots, 108_N$ is sent back by the probe 104 to the central processing unit 114. In a manner known per se, these time signals are sampled and digitized into $N_t$ successive samples before being submitted for processing by the computer program 118.

The computer program 118 then further includes instructions 124 to construct M matrices $MR_m$, $1 \leq m \leq M$, of ultrasound time signals of size $N \times N_t$, referred to as plane wave matrices. Each coefficient $MR_m(u_i, t_j)$ of each matrix $MR_m$ representing the $t_j$-th time sample of the measurement signal received by the $u_i$-th receiving transducer in response to the m-th transmission.

Optionally, the computer program 118 further includes instructions 126 to perform temporal filtering of each matrix $MR_m$, such filtering to remove any information at times of flight outside the zone of interest in the object 102.

The computer program 118 further includes instructions 128 for transforming each matrix $MR_m$ into a matrix $FTMR_m$ of frequency signals by two-dimensional Fourier transform in rows and columns, advantageously by discrete two-dimensional Fourier transform and, even more advantageously, by two-dimensional FFT calculation («Fast Fourier Transform») if the numbers N and $N_t$ of rows and columns of each matrix $MR_m$ allow it, i.e., if they correspond to powers of 2. We thus obtain M spectral matrices $FTMR_m$, $1 \leq m \leq M$, whose coefficients $FTMR_m(ku_i, kt_j)$ are spectral values taken as functions of discrete values $ku_i$, $1 \leq i \leq N$, of a spatial wavenumber ku (related to the relative arrangements of the receiving transducers) and discrete values $kt_j$, $1 \leq j \leq N_t$, of a temporal wavenumber kt (related to the sampling instants).

The computer program 118 further includes instructions 130 to convert each spectral matrix $FTMR_m$ into a spectral image $FTI_m$ in a space of spatial frequencies respectively relative to the abscissa and ordinate axes of the final image desired to be obtained. This yields M spectral images $FTI_m$, $1 \leq m \leq M$, of size $N_x \times N_z$ and coefficients $FTI_m(kx_i, kz_j)$ where the $kx_i$, $1 \leq i \leq N$, are discrete values of a spatial frequency kx related to the chosen abscissa axis (e.g., parallel to that of the transducers) and where the $kz_j$, $1 \leq j \leq N_z$, are discrete values of a spatial frequency kz related to the chosen ordinate axis (e.g., perpendicular to the transducer axis). As, for example, taught in the aforementioned Cheng et al document, this conversion involves applying a matrix transformation relation of the M matrices $FTMR_m$ into the M spectral images $FTI_m$ and applying a bilinear interpolation using a system of reference frame changing equations. Specifically, the matrix transformation yields values for the spectral images at points $(kx'_i, kz'_j)$, $1 \leq i \leq N$ and $1 \leq j \leq N_t$, which do not correspond to the chosen discrete values $(kx_i, kz_j)$ but depend on the system of reference frame change equations that relate the values of the spatial frequencies kx and kz to the values of the wave numbers ku and kt. The desired coefficients $FTI_m(kx_i,kz_j)$, with $1 \leq i \leq N_x$ and $1 \leq j \leq N_z$, can nevertheless be easily found by bilinear interpolation of the values $FTI_m(kx'_i,kz'_j)$ obtained by matrix transformation, using the system of reference frame change equations that allows us to know the positioning of the points $(kx'_i,kz'_j)$, $1 \leq i \leq N$ and $1 \leq j \leq N_t$.

The computer program 118 further includes instructions 132 for performing a combination of the M spectral images $FTI_m$ into a single resulting spectral image FTI of coefficients $FTI(kx_i,kz_j)$, $1 \leq i \leq N_x$ and $1 \leq j \leq N_z$. In a simple and fast embodiment, the spectral image FTI may result from a sum at each pixel $(kx_i,kz_j)$ of the M spectral images $FTI_m$.

Finally, the computer program 118 includes instructions 134 for transforming the resulting spectral image FTI into an ultrasound image I for viewing the object 102 by row and column two-dimensional inverse Fourier transform, advantageously by inverse discrete Fourier transform, and, even more advantageously, by two-dimensional calculation of IFFT (Inverse Fast Fourier Transform) if the numbers $N_x$ and $N_z$ of rows and columns of the resulting spectral image FTI allow it, i.e. if they correspond to powers of 2. The ultrasound image I for viewing the object 102 is of size $N_x \times N_z$ and pixel values $I(x_i,z_j)$.

According to the approach taught in the aforementioned Hunter et al document, by adapting the calculations exploiting the Weyl identity to the M plane wave transmissions shown in FIG. 2, we obtain the following general matrix transformation relationship between the M matrices $FTMR_m$ and the M spectral images $FTI_m$:

$$FTI_m(kx,kz) = \sqrt{kt^2 - ku^2} \cdot FTMR_m(ku,kt).  \quad [\text{Math. 1}]$$

More concretely, according to the previous discrete notations, for any m, $1 \leq m \leq M$, this gives:

$$\forall (i,j), 1 \leq i \leq N, 1 \leq j \leq N_t, FTI_m(kx'_i,kz'_j) = \sqrt{kt_j^2 - ku_i^2} \cdot FTMR_m(ku_i,kt_j). \quad [\text{Math. 2}]$$

We also obtain the following system of general reference frame change equations, which links the values of the spatial frequencies kx and kz to the values of the wave numbers ku and kt:

$$\begin{cases} kx = ku + kt \cdot \sin\theta_m \\ kz = \sqrt{kt^2 - ku^2} + kt \cdot \cos\theta_m \end{cases}. \quad [\text{Math. 3}]$$

More concretely, according to the previous discrete notations, for any m, $1 \leq m \leq M$, this gives:

$$\forall (i,j), 1 \leq i \leq N, 1 \leq j \leq N_t, \quad [\text{Math. 4}]$$
$$\begin{cases} kx'_i = ku_i + kt_j \cdot \sin\theta_m \\ kz'_j = \sqrt{kt_j^2 - ku_i^2} + kt_j \cdot \cos\theta_m \end{cases}.$$

But these equations are only valid for direct mode backscattering, i.e. without any reflection against an edge of the observed object 102, and without any change of propagation mode during the backscattering. They are therefore suitable for most medical applications and for simple defect searches in simple non-destructive testing contexts. But they are not suitable for more complex non-destructive testing contexts such as those mentioned above In accordance with the present invention, it is advantageously provided that parameters or terms of change in propagation mode or reflection(s) against at least one wall of the object 102 are integrated into the aforementioned equations. More specifically, at least one of the following is integrated:

- a parameter $\gamma$ characterizing a change in propagation mode upon backscattering against a defect of the object 102, integrated in the aforementioned system of reference frame change equations, and/or
- a phase shift term $e^{j\varphi(ku,kt,\theta_m)}$ characterizing at least one reflection against a wall of the object 102, embedded in the aforementioned matrix transformation relation, where e is the exponential function, j is the pure imaginary number such that $j^2 = -1$ and $\varphi$ is a phase shift function depending a priori on ku, kt and $\theta_m$.

There may also be a change in mode upon any reflection against a wall of the object 102. It should be noted in this regard that the temporal wavenumber kt depends on the propagation mode, so that the wavenumber corresponding to an incident transmitted wave may differ from the wavenumber corresponding to the same wave when it has been reflected at least once as well as after backscattering, due to a possible consideration of changes in propagation modes. On the other hand, what remains constant for the same wave whatever the changes of modes, is the product of the wave number and the propagation velocity of the wave, that is to say its angular frequency. By convention, we will note in the following kt the wavenumber corresponding to the wave in its mode of propagation as it appears just after its backscattering.

Thus, taking into account at least one reflection of the transmitted waves against at least one wall of the object 102, the aforementioned general matrix transformation relation between the M matrices $FTMR_m$ and the M spectral images $FTI_m$ becomes more precisely:

$$FTI_m(kx,kz) = \sqrt{kt^2 - ku^2} \cdot e^{j\varphi(ku,kt,\theta_m)} \cdot FTMR_m(ku,kt). \quad [\text{Math. 5}]$$

Taking into account a change of propagation mode during a backscatter against a defect of the object 102, the aforementioned system of reference frame change equations becomes more precisely:

$$\begin{cases} kx = ku + \gamma \cdot kt \cdot \sin\theta'_m \\ kz = \pm\sqrt{kt^2 - ku^2} \pm \gamma \cdot kt \cdot \cos\theta'_m \end{cases}. \quad [\text{Math. 6}]$$

In this system of equations, the symbol $\pm$ represents an addition or a subtraction depending on the number of reflection(s) against one or more walls of the object 102. The angle $\theta'_m$ is the incident angle during backscattering. It can be obtained simply from the angle $\theta_m$ using the Snell-Descartes law and as a function of the number of reflection(s) preceding the considered backscatter. Like $\theta_m$, it is expressed as a function of the z-axis shown in FIG. 2, i.e. an axis orthogonal to the plane or axis of the transducers.

Also in this system of equations, $\gamma$ is the parameter characterizing the change in propagation mode of a wave upon backscattering into the object 102. When integrated into the system of equations in this way, it is defined as the ratio of the propagation velocity of the transmitted wave according to its propagation mode after backscattering in the probed object to the propagation velocity of the same wave according to its propagation mode before backscattering in the probed object. Therefore, if kt is the wavenumber corresponding to the wave after backscattering, γ·kt is the wavenumber corresponding to the incident wave during backscattering.

To further clarify the above relationship and system of equations, it is necessary to distinguish between different possible cases of reflection(s) and change(s) of mode(s).

Figure 3:
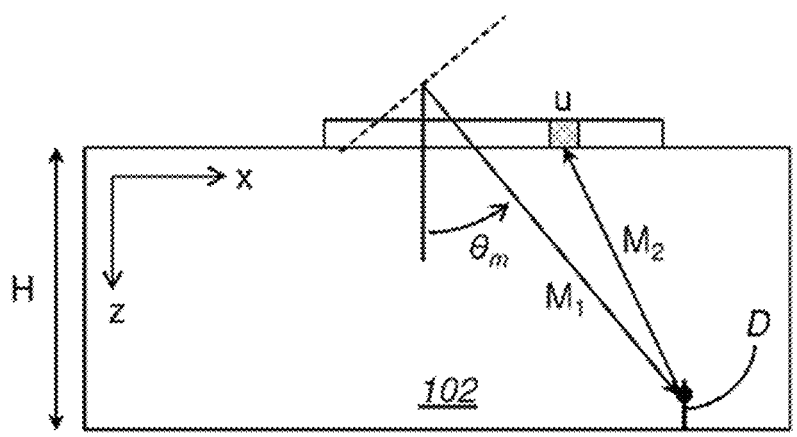
FIG. 3 shows a first case of taking into account possible reflection(s) and/or change(s) of mode(s) for the device of FIG. 1.

In accordance with a first case of taking into account possible reflection(s) and/or mode change(s), no reflection against a wall of the object is taken into account, but a change in propagation mode is taken into account during any backscattering against a defect D of the object 102. This first case is shown in FIG. 3. The chosen x-axis of the abscissas is parallel to the transducers, to the front face plane and to the bottom plane of the object 102. The chosen z-axis of ordinates, from which the angles $\theta_m$ and $\theta'_m$, are defined, is meanwhile orthogonal to the transducers, the plane of the front face and the plane of the bottom of the object 102. Any wave incident during backscattering coming directly from the probe 104 without any reflection, it is noted that $\theta'_m=\theta_m$. The defect D is, for example, an extended shear defect located at the bottom of object 102. Calculations using the Weyl identity at the M plane wave transmissions shown in FIG. 2 then give, for the aforementioned general matrix transformation relation:

$$FTI_m(kx,kz)=\sqrt{kt^2-ku^2}\cdot FTMR_m(ku,kt). \quad \text{[Math. 7]}$$

In other words:

$$\varphi(ku,kt,\theta_m)=0. \quad \text{[Math. 8]}$$

Calculations using the Weyl identity at the M plane wave transmissions shown in FIG. 2 also give, for the aforementioned system of equations for changing the reference frame:

$$\begin{cases} kx = ku + \gamma \cdot kt \cdot \sin\theta_m \\ kz = \sqrt{kt^2 - ku^2} + \gamma \cdot kt \cdot \cos\theta_m \end{cases} \quad \text{[Math. 9]}$$

According to this first case, the parameter γ is different from 1. It is equal to the ratio $c_2/c_1$ between the propagation velocity $c_2$ of the backscattered wave in the $M_2$ mode and the propagation velocity $c_1$ of the incident wave in the $M_1$ mode before its backscattering against the defect D. It is strictly less than 1 if the change of mode is that of a longitudinal propagation mode noted L (before backscattering) into a transverse propagation mode noted T (after backscattering). On the contrary, it is strictly greater than 1 if the change of mode is that of a propagation mode T (before backscattering) into a propagation mode L (after backscattering). We also note that if no change in propagation mode at backscatter, γ=1, were taken into account, we would find the first relation and system of equations defined previously resulting from the aforementioned teaching adaptation of the Cheng et al. document.

Figure 4:
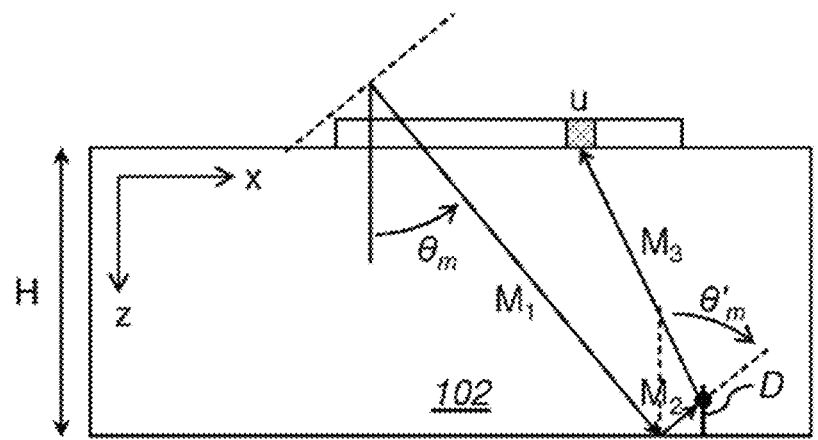
FIG. 4 shows a second case of taking into account possible reflection(s) and/or change(s) of mode(s) for the device of FIG. 1.

In accordance with a second case of taking into account possible reflection(s) and/or mode change(s), generally referred to as "half-bounce mode", a reflection against the bottom of the object 102, at a distance H from its front face, is taken into account, and a change in propagation mode can be taken into account during this reflection or any subsequent backscattering against a defect of the object 102. This second case is shown in FIG. 4. The chosen x-axis of abscissa is still parallel to the transducers, the front face plane and the bottom plane of the object 102. The chosen z-axis of ordinates, from which the angles $\theta_m$ and $\theta'_m$ are defined, is also still orthogonal to the transducers, the front face plane, and the bottom plane of the object 102. This is again an extended shear defect located at the bottom of the object 102. Calculations using the Weyl identity at the M plane wave transmissions shown in FIG. 2 then give, for the above-mentioned general matrix transformation relation:

$$FTI_m(kx,kz)=\sqrt{kt^2-ku^2}\cdot e^{jH\cdot(\gamma_r\cdot\gamma\cdot kt\cdot\cos\theta_m+\gamma\cdot kt\cdot\cos\theta'_m)}\cdot FTMR_m(ku,kt). \quad \text{[Math. 10]}$$

In other words:

$$\varphi(ku,kt,\theta_m)=H\cdot(\gamma_r\cdot\gamma\cdot kt\cdot\cos\theta_m+\gamma\cdot kt\cdot\cos\theta'_m). \quad \text{[Math. 11]}$$

In this matrix transformation relation, $\gamma_r$ is the parameter characterizing the possible change of propagation mode upon reflection against the bottom of the probed object. It is defined as the ratio $c_2/c_1$ between the propagation velocity $c_2$ of the wave transmitted according to its propagation mode $M_2$ after its reflection against the bottom of the probed object and the propagation velocity $c_1$ of this same wave according to its propagation mode $M_1$ before its reflection against the bottom of the probed object. The parameter γ is then defined as the ratio $c_3/c_2$ where $c_3$ is the propagation velocity of the backscattered wave in $M_3$ mode. Therefore, if kt is the wavenumber corresponding to the wave after backscattering, $\gamma_r\cdot\gamma\cdot kt$ is the wavenumber corresponding to the incident wave transmitted before its reflection against the bottom of the object 102 and γ·kt is the wavenumber corresponding to the incident wave after its reflection against the bottom of the object 102 but before its subsequent backscattering. According to this second case, the parameter γ may be equal to 1 if there is no consideration of propagation mode change during backscatter. Similarly, $\gamma_r$ is equal to 1 if there is no consideration of propagation mode change during reflection against the bottom of the object 102. On the contrary, it is different from 1 as soon as a change of propagation mode is taken into account during this reflection. More precisely, it is strictly less than 1 if the change of mode is that of a propagation mode L (before reflection) into a propagation mode T (after reflection). It is strictly greater than 1 if the change of mode is that of a propagation mode T (before reflection) into a propagation mode L (after reflection).

Calculations using the Weyl identity at the M plane wave transmissions shown in FIG. 2 also give, for the aforementioned system of equations of reference frame change:

$$\begin{cases} kx = ku + \gamma \cdot kt \cdot \sin\theta'_m \\ kz = \sqrt{kt^2 - ku^2} - \gamma \cdot kt \cdot \cos\theta'_m \end{cases} \quad \text{[Math. 12]}$$

In the particular case of a reflection followed by a backscatter without any change of propagation mode ($\theta'_m=\theta_m$), we obtain the following simplified relation:

$$FTI_m(kx,kz)=\sqrt{kt^2-ku^2}\cdot e^{j2H\cdot kt\cdot\cos\theta_m}\cdot FTMR_m(ku,kt). \quad \text{[Math. 13]}$$

We also obtain the following system of equations for simplified reference frame change:

$$\begin{cases} kx = ku + kt \cdot \sin\theta_m \\ kz = \sqrt{kt^2 - ku^2} - kt \cdot \cos\theta_m \end{cases} \quad \text{[Math. 14]}$$

Figure 5:
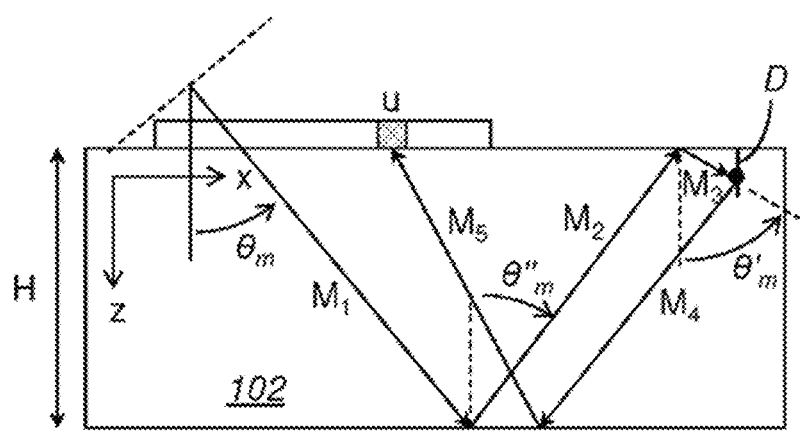
FIG. 5 shows a third case of taking into account possible reflection(s) and/or change(s) of mode(s) for the device of FIG. 1.

In accordance with a third case of consideration of possible reflection(s) and/or mode change(s), generally referred to as a "full bounce mode," a first reflection against the bottom of the object 102 is considered, a second reflection against the front face of the object 102 is considered, a third reflection against the bottom of the object 102 is considered, and a change in propagation mode may be considered during each of these three reflections or any backscatter against a defect in the object 102 between the second and third reflections. This third case is shown in FIG. 5. The chosen x-axis of abscissa is still parallel to the transducers, the front face plane and the bottom plane of the object 102. The chosen z-axis of ordinates, from which the angles $\theta_m$ and $\theta'_m$, are defined, is also still orthogonal to the transducers, the front face plane, and the bottom plane of the object 102. The angle $\theta'_m$ remains the incident angle during backscattering, i.e., that after the second reflection against the front face of the object. On the other hand, another angle $\theta''_m$, is introduced, also defined from the z axis, corresponding to the angle of the wave after its first reflection against the bottom of the object 102. Calculations using Weyl's identity for the M plane wave transmissions shown in FIG. 2 then give, for the general matrix transformation relation mentioned above:

$$FTI_m(kx, kz) = \sqrt{kt^2 - ku^2} \cdot$$
$$e^{jH \cdot \left(\gamma_{r1} \cdot \gamma_{r2} \cdot \gamma \cdot kt \cdot \cos\theta_m + \gamma_{r2} \cdot \gamma \cdot kt \cdot \cos\theta''_m + \sqrt{kt^2 - ku^2} + \sqrt{(kt/\gamma_{r4})^2 - ku^2}\right)} \cdot FTMR_m(ku, kt).$$

[Math. 15]

In other words:

$$\varphi(ku, kt, \theta_m) = H \cdot$$
$$\left(\gamma_{r1} \cdot \gamma_{r2} \cdot \gamma \cdot kt \cdot \cos\theta_m + \gamma_{r2} \cdot \gamma \cdot kt \cdot \cos\theta''_m + \sqrt{kt^2 - ku^2} + \sqrt{(kt/\gamma_{r4})^2 - ku^2}\right).$$

[Math. 16]

In this matrix transformation relation, kt is still the wavenumber just after backscattering by the defect, corresponding here to the propagation mode $M_4$. In this matrix transformation relation also, $\gamma_{r1}$ is the parameter characterizing the possible change of propagation mode during the first reflection against the bottom of the probed object, $\gamma_{r2}$ is the parameter characterizing the possible change of propagation mode during the second reflection against the front side of the probed object and $\gamma_{r4}$ s the parameter characterizing the possible change of propagation mode during the third reflection against the bottom of the probed object. Each $\gamma_{ri}$, for i=1, 2 or 4, is defined as the ratio $c_{i+1}/c_i$ between the propagation velocity $c_{i+1}$ of the transmitted wave according to its propagation mode $M_{i+1}$ after reflection and the propagation velocity $c_i$ of this same wave according to its propagation mode $M_i$ before reflection. The parameter $\gamma$ is then defined as the ratio $c_4/c_3$ where $c_4$ is the propagation velocity of the backscattered wave in the $M_4$ mode and $c_3$ is the propagation velocity of the wave just before backscatter in the $M_3$ mode. Therefore, if kt is still the wavenumber corresponding to the wave just after backscattering, $\gamma_{r1} \cdot \gamma_{r2} \cdot \gamma \cdot kt$ is the wavenumber corresponding to the incident wave transmitted before its first reflection against the bottom of the object 102 and $\gamma_{r2} \cdot \gamma \cdot kt$ corresponds to the wave just after this first reflection. Finally, $kt/\gamma_{r4}$ is the wave number corresponding to the wave received by the transducers. According to this third case, the parameter $\gamma$ can be equal to 1 if there is no consideration of change of propagation mode during backscattering. Similarly, $\gamma_{ri}$, for i=1, 2 or 4, is equal to 1 if there is no consideration of propagation mode change during the corresponding reflection in the object 102. On the contrary, it is different from 1 as soon as a change of propagation mode is taken into account during this reflection. More precisely, it is strictly less than 1 if the change of mode is that of a propagation mode L (before the reflection) into a propagation mode T (after the reflection). It is strictly greater than 1 if the change of mode is that of a mode of propagation T (before the reflection) into a mode of propagation L (after the reflection).

Calculations using the Weyl identity at the M plane wave transmissions shown in FIG. 2 also give, for the aforementioned system of equations of reference frame change:

$$\begin{cases} kx = ku + \gamma \cdot kt \cdot \sin\theta'_m \\ kz = -\sqrt{kt^2 - ku^2} + \gamma \cdot kt \cdot \cos\theta'_m \end{cases}$$

[Math. 17]

In the special case of two successive reflections followed by a back-propagation followed by a final reflection without any change in propagation mode ($\theta'_m = \theta''_m = \theta_m$), we obtain the following simplified relation:

$$FTI_m(kx, kz) =$$
$$\sqrt{kt^2 - ku^2} \cdot e^{j2H \cdot \left(kt \cdot \cos\theta_m + \sqrt{kt^2 - ku^2}\right)} \cdot FTMR_m(ku, kt).$$

[Math. 18]

We also obtain the following simplified system of equations for changing the reference frame:

$$\begin{cases} kx = ku + kt \cdot \sin\theta_m \\ kz = -\sqrt{kt^2 - ku^2} + kt \cdot \cos\theta_m \end{cases}$$

[Math. 19]

According to a secondary aspect of the invention, it is advantageous to limit by windowing the supports of the respective spectral spaces of the spectral matrices and images $FTMR_m$ and $FTI_m$. By limiting these supports, one benefits in fact from a gain in memory and especially in calculations. It is also advantageous to note that according to the different possible cases of taking into account reflection(s) and/or change(s) of mode(s), the system of equations of change of reference frame can be bijective or not. In case of non-bijectivity, the support can be even more limited to avoid any ambiguity involving a risk of artifacts, which further simplifies the calculations. The missing data resulting from these support limitations are in any case compensated by the combination of the M spectral images $FTI_m$ which joins all their supports.

Figure 6:
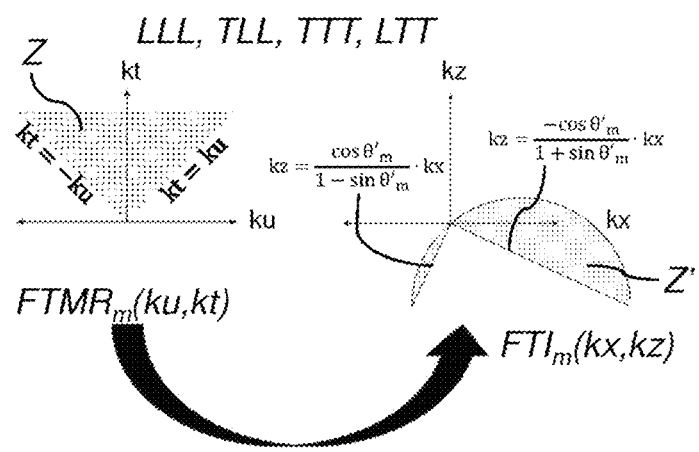
FIG. 6 shows the result of a first example of matrix conversion that can be performed by the device of FIG. 1, in the case of FIG. 4.
Figure 7:
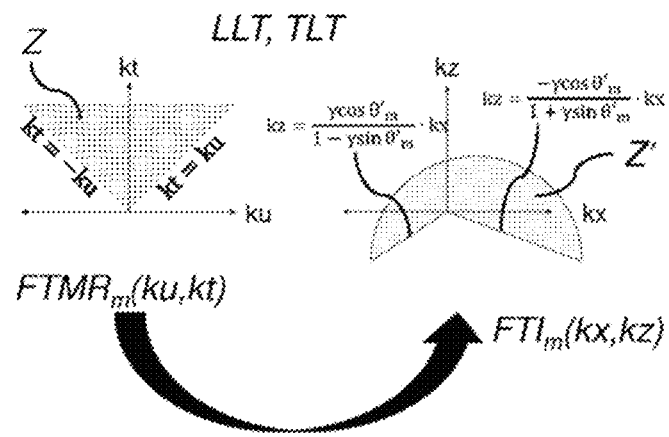
FIG. 7 shows the result of a second example of matrix conversion that can be performed by the device of FIG. 1, in the case of FIG. 4.
Figure 8:
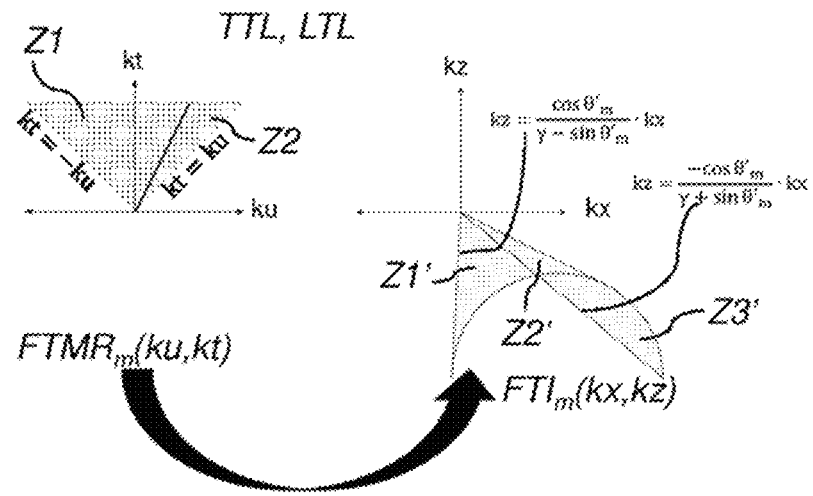
FIG. 8 shows the result of a third example of matrix conversion that can be performed by the device of FIG. 1, in the case of FIG. 4.

Three examples are given by way of illustration in FIGS. 6, 7 and 8 in the second case mentioned above and shown in FIG. 4 of a single reflection against the bottom of the object 102 with or without changes of propagation modes of the transmitted waves.

FIG. 6 shows the effect of the system of reference frame change equations on the supports of a spectral matrix $FTMR_m$ and its conversion into a spectral image $FTI_m$, when no change in propagation mode occurs during wave backscattering ($\gamma$=1). This thus includes the modes denoted LLL (for $M_1$=L, $M_2$=L, $M_3$=L), TLL (for $M_1$=T, $M_2$=L, $M_3$=L), TTT (for $M_1$=T, $M_2$=T, $M_3$=T) and LTT (for $M_1$=L, $M_2$=T, $M_3$=T). According to a first limitation by spectral support windowing, only the values of kt greater than or equal to the absolute value of ku, for each ku, are retained, which forms an upwardly open triangular Z-support for the spectral matrix $FTMR_m$. It can indeed be considered that outside of this Z-support the waves are evanescent (i.e. they do not propagate) and therefore not significant. Given the form that the system of reference frame change equations takes for γ=1 in this second case, this results in a Z' support in a portion of a disk bounded by an angular sector (i.e., a spectral windowing) depending on the condition kt≥|ku| for the spectral image $FTI_m$. This system of reference frame change equations is bijective so that it is not particularly appropriate to further constrain the Z support (and hence the Z' support).

FIG. 7 shows the effect of the system of reference frame change equations on the supports of a spectral matrix $FTMR_m$ and its conversion to a spectral image $FTI_m$, when a change in propagation mode from L to T occurs during wave backscatter (γ<1). This thus includes the modes denoted LLT (for $M_1$=L, $M_2$=L, $M_3$=T) and TLT (for $M_1$=T, $M_2$=L, $M_3$=T). As before, according to a first spectral support limitation, only values of kt greater than or equal to the absolute value of ku, for each ku, are retained, forming an upwardly open triangular Z-support for the spectral matrix $FTMR_m$. Given the form that the system of reference frame change equations takes for γ<1 in this second case, this results in a disk portion support Z' bounded by an angular sector depending on the condition kt≥|ku| for the spectral image $FTI_m$. This system of reference frame change equations is still bijective so that it is not particularly appropriate to further constrain the support Z (and hence the support Z').

FIG. 8 shows the effect of the system of reference frame change equations on the supports of a spectral matrix $FTMR_m$ and its conversion to a spectral image $FTI_m$, when a change in propagation mode from T to L occurs during wave backscatter (γ>1). This thus includes modes LTL (for $M_1$=L, $M_2$=T, $M_3$=L) and TTL (for $M_1$=T, $M_2$=T, $M_3$=L). As before, according to a first spectral support limitation, only values of kt greater than or equal to the absolute value of ku, for each ku, are retained, forming an upwardly open triangular Z-support for the spectral matrix $FTMR_m$. Given the form that the system of reference frame changing equations takes for γ>1 in this second case, this results in a support Z' with a more complex shape than the previous ones, in which a zone Z2' of overlap is spotted. More precisely, the support Z can be split into two zones Z1 and Z2, with Z1 projecting onto two zones Z1' and Z2' of the support Z' by changing the reference frame, while Z2 projects onto two zones Z2' and Z3' of the support Z'. This means that in zone Z2', each pair (kx, kz) has two antecedents in zones Z1 and Z2 respectively. It follows that for γ>the system of reference frame change equations is not bijective because not injective, so that it becomes appropriate to further restrict the support Z (and hence the support Z'). For example, one can keep only the Z2 support zone for the spectral matrix $FTMR_m$, i.e. keep only the union of the Z2' and Z3' support zones for the spectral image $FTI_m$. This constitutes a much more selective spectral windowing. But the loss of information is not significant considering the subsequent combination of the M spectral images $FTI_m$. On the other hand, as already underlined, the gain in memory and calculations is important, as well as in the limitation of artifacts.

Figure 9:
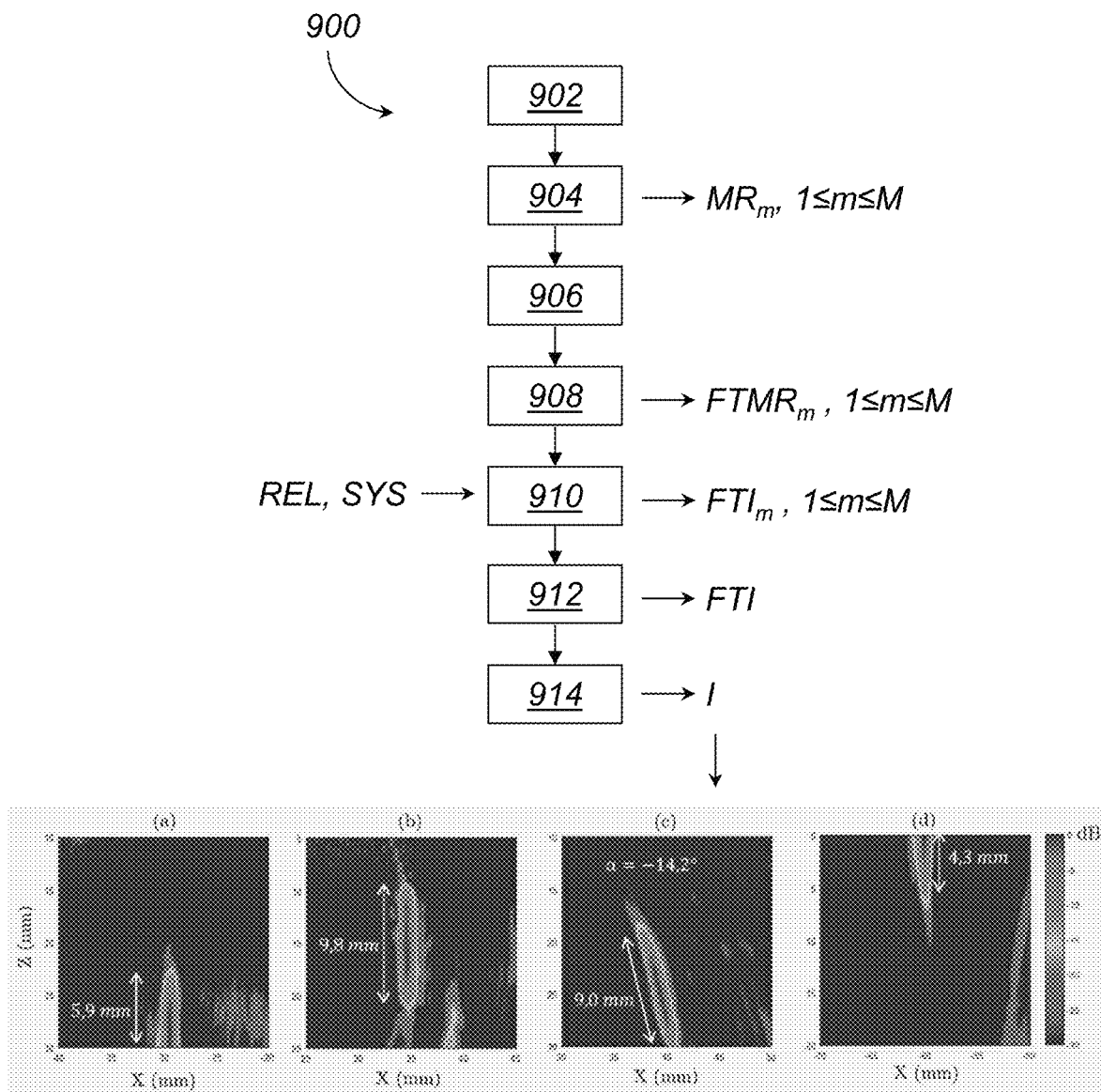
FIG. 9 shows the successive steps of an ultrasound signal acquisition and processing method implemented by the device of FIG. 1, according to an embodiment of the invention.

With reference to FIG. 9, an example of a method 900 for acquiring and processing ultrasonic signals that can be implemented by the device 100 of FIG. 1 will now be described according to a preferred embodiment of the invention.

In a step 902, the processing unit 114 executing the instructions 120 controls the transmission and reception sequences of the transducers $108_1, \ldots, 108_N$ for the acquisition of the measurement signals.

These sequences are M in number, an integer number that can be much smaller than the number N of transducers $108_1, \ldots, 108_N$. After each shot, the signals are received on all N transducers, digitized and transmitted to the electronic circuit 112.

In a step 904, the processing unit 114 executing the instructions 124 records the measurement signals, with the measurement signals sampled, digitized, and distributed into the M matrices $MR_m$, 1≤m≤M, for further processing. Steps 902 and 904 may be performed simultaneously, i.e. it is not necessary to wait until all shots are fired to begin recording the measurement signals and performing processing such as image reconstruction.

In an optional step 906, the processing unit 114 executing the instructions 126 performs a temporal filtering of each matrix $MR_m$, this filtering aiming to remove any information located at times of flight outside of the zone of interest. This step 906 makes it possible to limit the zone to be imaged to a close vicinity of the defects by excluding, in particular, the disturbing echogenic interfaces. It is particularly useful for imaging cracks forming from the bottom of the object.

In a step 908, the processing unit 114 executing the instructions 128 performs a row and column two-dimensional discrete Fourier transform of each matrix $MR_m$ to obtain the M spectral matrices $FTMR_m$.

In a step 910, the processing unit 114 executing the instructions 130 converts each matrix $FTMR_m$ to obtain the M spectral images $FTI_m$ using a matrix transformation relation REL and a system SYS of reference frame changing equations, selected according to the desired consideration of reflection(s) and/or mode change(s).

In a step 912, the processing unit 114 executing the instructions 132 performs the combination of the M spectral images $FTI_m$ into a single resulting spectral image FTI.

Finally, in a last step 914, the processing unit 114 executing the instructions 134 performs a two-dimensional inverse discrete Fourier transform in rows and columns of the resulting spectral image FTI to obtain the ultrasound image I for viewing the object 102.

An example (a) of an ultrasound image I, in which a defect of length 5.9 mm at the bottom of the object is visible, is given for TTT imaging with T-mode transmission, taking into account a bounce at the bottom of the object 102 without changing of mode.

An example (b) of an ultrasound image I, in which a defect of length 9.8 mm in the object is visible, is given for LLT imaging with L-mode transmission, taking into account a bounce at the bottom of the object 102 and a change from L to T mode during backscatter.

An example (c) of an ultrasound image I, in which a defect of length 9.0 mm and inclination at −14.2° at the bottom of the object is visible, is given for TTL imaging with T-mode transmission, taking into account a bounce at the bottom of the object 102 and a change from T to L mode during backscatter.

Finally, an example (d) of an ultrasound image I, in which a defect of length 4.3 mm at the front of the object is visible, is given for TTTTT imaging with T-mode transmission taking into account two bounces at the bottom and at the front face of the object 102 without changing mode. In each of these examples, the defects, which are of a type that is generally difficult to detect and visualize, are here very clearly visible, localized and measurable.

It clearly appears that an ultrasonic probing device such as the one described above allows the visualization of complex and usually not very visible defects by cleverly taking into account possible reflections and changes of propagation modes of transmitted waves using two-dimensional Fourier transform ultrasonic imaging. This clever consideration does not add complexity to the performed processing. A limitation of spectral support can also be considered, further simplifying the calculations.

It should also be noted that the invention is not limited to the embodiments described above. Indeed, it will appear to those skilled in the art that various modifications can be made to the above-described embodiments, in the light of the teaching just disclosed to them.

In particular, computer program instructions could be replaced by electronic circuits dedicated to the functions performed during the execution of these instructions.

In particular too, only examples of ultrasonic imaging where the transmit/receive transducers are in contact with the object to be probed have been considered in FIGS. 3 to 9. But as shown in FIG. 1, the probe 104 may be at a distance from the object 102, for example immersed in a liquid for proper transmission of the ultrasound waves. But the general principles of the present invention remain valid, only the equations must be adapted by adding phase terms to take into account the transmission of waves, at transmission and reception, in the liquid medium considered between the probe and the front face of the object. This adaptation is particularly simple and within the reach of those skilled in the art.

In general, in the above detailed presentation of the invention, the terms used should not be interpreted as limiting the invention to the embodiments set forth in the present description, but should be interpreted to include all equivalents the anticipation of which is within the grasp of those skilled in the art by applying their general knowledge to the implementation of the teaching just disclosed to them.

The invention claimed is:

1. An imaging method by two-dimensional Fourier transform of an acquisition (S) by ultrasonic probing of an object, comprising the following steps:
   control of L transmission transducers ($108_1, \ldots, 108_N$) for M successive transmissions of ultrasonic waves,
   control of N receiving transducers ($108_1, \ldots, 108_N$) in such a way as to receive simultaneously and for a predetermined duration, for each transmission, N measurement time signals, measuring in particular echoes due to backscattering of said each transmission in the object,
   time sampling of each measurement time signal into $N_t$ successive samples,
   obtaining M matrices $MR_m$, $1 \le m \le M$, of ultrasonic time signals of size $N \times N_t$, each coefficient $MR_m(u_i, t_j)$ of each matrix $MR_m$ representing the $t_j$-th time sample of the measurement signal received by the $u_i$-th receiving transducer due to the m-th transmission,
   row and column two-dimensional Fourier transform of each matrix $MR_m$ to obtain M spectral matrices $FTMR_m$, $1 \le m \le M$,
   conversion of each spectral matrix $FTMR_m$ to obtain M spectral images $FTI_m$ in a space of spatial frequencies, this conversion comprising the application of a relation (REL) for matrix transformation of the M matrices $FTMR_m$ into the M spectral images $FTI_m$ and the application of a bilinear interpolation using a system (SYS) of reference frame change equations,
   combination of the M spectral images $FTI_m$ and two-dimensional inverse Fourier transformation in rows and columns of the resulting spectral image FTI to obtain an ultrasound image I for visualization of the object,
wherein the conversion comprises:
   taking into account a change of propagation mode ($M_1$, $M_2$, $M_3$, $M_4$, $M_5$) during a backscattering in the probed object, by adding a parameter characterizing this change of mode in the equations (SYS) of change of reference frame, and/or taking into account a reflection against a wall of the probed object, by adding a phase shift term in the relation (REL) of matrix transformation.

2. The imaging method according to claim 1, wherein the L transmitting transducers ($108_1, \ldots, 108_N$) are controlled for M successive transmissions of plane ultrasonic waves with different successive transmission angles $\theta_m$ in M transmission zones.

3. The imaging method according to claim 2, wherein upon conversion of each spectral matrix $FTMR_m$ to each spectral image $FTI_m$, the reference frame change equations (SYS) take the following form:

$$\begin{cases} kx = ku + \gamma \cdot kt \cdot \sin\theta'_m \\ kz = \pm \sqrt{kt^2 - ku^2} \pm \gamma \cdot kt \cdot \cos\theta'_m \end{cases},$$

where ku and kt are the wavenumbers, spatial and temporal respectively, representative of the rows and columns of each spectral matrix $FTMR_m$, kx and kz are the spatial frequencies representative of the rows and columns of each spectral image $FTI_m$, $\pm$ represents an addition or subtraction, $\gamma$ is the parameter characterizing the change in propagation mode upon backscattering in the probed object, and $\theta'_m$ is an incident angle upon backscattering determinable from $\theta_m$ using the Snell-Descartes law.

4. The imaging method according to claim 3, wherein the parameter $\gamma$ is defined as the ratio of the propagation velocity of any wave transmitted according to its propagation mode after backscattering in the probed object to the propagation velocity of the same wave according to its propagation mode before backscattering in the probed object.

5. The imaging method according to claim 3, wherein upon conversion of each spectral matrix $FTMR_m$ to each spectral image $FTI_m$, the matrix transformation relationship (REL) takes the following form:

$$FTI_m(kx, kz) = \sqrt{kt^2 - ku^2} \cdot e^{j\varphi(ku, kt, \theta_m)} \cdot FTMR_m(ku, kt),$$

where ku and kt are the spatial and temporal wavenumbers, respectively, representative of the rows and columns of each spectral matrix $FTMR_m$, kx and kz are the spatial frequencies representative of the rows and columns of each spectral image $FTI_m$, e is the exponential function, j is the pure imaginary number such that $j^2 = -1$ and $\varphi$ is a phase shift function depending on ku, kt and $\theta_m$.

6. The imaging method according to claim 5, not taking into account any reflection against a wall of the object, wherein:

$$\varphi(ku, kt, \theta_m) = 0,$$

$$\begin{cases} kx = ku + \gamma \cdot kt \cdot \sin\theta_m \\ kz = \sqrt{kt^2 - ku^2} + \gamma \cdot kt \cdot \cos\theta_m \end{cases}.$$

7. The imaging method according to claim 5, taking into account a reflection against a bottom of the object located at a distance H from a front face of the object receiving the waves transmitted by the transmission transducers, wherein:

$$\varphi(ku, kt, \theta_m) = H \cdot (\gamma_r \cdot \gamma \cdot kt \cdot \cos\theta_m + \gamma \cdot kt \cdot \cos\theta'_m),$$

$$\begin{cases} kx = ku + \gamma \cdot kt \cdot \sin\theta'_m \\ kz = \sqrt{kt^2 - ku^2} + \gamma \cdot kt \cdot \cos\theta'_m \end{cases},$$

where $\gamma_r$ is a parameter characterizing a possible change of propagation mode during the reflection against the bottom of the probed object, in particular defined as the ratio between the propagation velocity of any wave transmitted according to its propagation mode after its reflection and the propagation velocity of this same wave according to its propagation mode before its reflection.

8. The imaging method according to claim 3, taking into account a first reflection against a bottom of the object located at a distance H from a front face of the object receiving the waves transmitted by the transmission transducers, a second reflection against the front face of the object and a third reflection against the bottom of the object, wherein:

$$\varphi(ku, kt, \theta_m) = H \cdot \Big( \gamma_{r1} \cdot \gamma_{r2} \cdot \gamma \cdot kt \cdot \cos\theta_m + \gamma_{r2} \cdot \gamma \cdot kt \cdot \cos\theta''_m + \sqrt{kt^2 - ku^2} + \sqrt{(kt/\gamma_{r4})^2 - ku^2} \Big),$$

$$\begin{cases} kx = ku + \gamma \cdot kt \cdot \sin\theta'_m \\ kz = -\sqrt{kt^2 - ku^2} + \gamma \cdot kt \cdot \cos\theta'_m \end{cases},$$

where $\gamma_{r1}$ is a parameter characterizing a possible change of propagation mode during the first reflection against the bottom of the probed object, in particular defined as a ratio between the propagation velocity of any wave transmitted according to its propagation mode after its first reflection and the propagation velocity of this same wave according to its propagation mode before its first reflection, $\gamma_{r2}$ is a parameter characterizing a possible change of propagation mode during the second reflection against the front face of the probed object, in particular defined as the ratio between the propagation velocity of any wave transmitted according to its propagation mode after its second reflection and the propagation velocity of this same wave according to its propagation mode before its second reflection, $\gamma_{r4}$ is a parameter characterizing a possible change of propagation mode during the third reflection against the bottom of the probed object, in particular defined as a ratio between the propagation velocity of any wave transmitted according to its propagation mode after its third reflection and the propagation velocity of this same wave according to its propagation mode before its third reflection, and $\theta''_m$ is a reflected angle during the first reflection against the bottom of the object determinable from $\theta_m$ using the Snell-Descartes law.

9. The imaging method according to claim 1, wherein the conversion of each spectral matrix $FTMR_m$ to obtain the M spectral images $FTI_m$ includes a support limitation of a spectral space of each spectral matrix $FTMR_m$ to keep only the propagating waves and to remove any correspondence ambiguity between the spectral space of each spectral matrix $FTMR_m$ and that of the corresponding spectral image $FTI_m$ when the system (SYS) of reference frame change equations is not bijective.

10. A computer program downloadable from a communication network and/or stored on a computer-readable medium and/or executable by a processor, comprising instructions for performing the steps of an imaging method according to claim 1, when said program is executed on a computer.

11. An ultrasonic probing device, for ultrasonic probing of an object, comprising:
   a probe comprising L ultrasonic transmitting and N ultrasonic receiving transducers ($108_1, \ldots, 108_N$),
   means for controlling the L transmission transducers for M successive transmissions of ultrasonic waves,
   means for controlling the N receiving transducers in such a way as to receive simultaneously and for a predetermined duration, for each transmission, N measurement time signals, measuring in particular echoes due to back-scattering of said each transmission, and
   a processor for reconstructing an ultrasound image (I) for visualizing the object, configured to perform the following processing:
      temporal sampling of each measurement time signal in $N_t$ successive samples,
      obtaining M matrices $MR_m$, $1 \leq m \leq M$, of ultrasonic time signals of size $N \times N_t$,
      each coefficient $MR_m(u_i, t_j)$ of each matrix $MR_m$ representing the $t_j$-th time sample of the measurement signal received by the $u_i$-th receiving transducer due to the m-th transmission,
      row and column two-dimensional Fourier transform of each matrix $MR_m$ to obtain M spectral matrices $FTMR_m$, $1 \leq m \leq M$,
      conversion of each spectral matrix $FTMR_m$ to obtain M spectral images $FTI_m$ in a space of spatial frequencies, this conversion comprising the application of a relation (REL) of matrix transformation of the M matrices $FTMR_m$ into the M spectral images $FTI_m$ and the application of a bilinear interpolation using a system (SYS) of equations for change of reference frame,
      combination of the M spectral images $FTI_m$ and two-dimensional inverse Fourier transformation in rows and columns of the resulting spectral image FTI to obtain an ultrasound image I of the object,
   wherein the processor is further configured to:
      take into account a change of propagation mode during a backscatter in the probed object, by adding a parameter characterizing this change of mode in the equations (SYS) of change of reference frame, and/or
      take into account a reflection against a wall of the probed object, by adding a phase shift term in the relation (REL) of matrix transformation,
   when it performs the conversion.

* * * * *